(12) United States Patent
Park et al.

(10) Patent No.: US 10,573,946 B2
(45) Date of Patent: Feb. 25, 2020

(54) LITHIUM AIR BATTERY

(71) Applicant: SK Innovation Co., Ltd., Seoul (KR)

(72) Inventors: Myoung Gu Park, Daejeon (KR); Kyong Sik Kim, Daejeon (KR); Hee Young Sun, Daejeon (KR); Dock Young Yoon, Daejeon (KR); Sang Jin Kim, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 253 days.

(21) Appl. No.: 14/406,397

(22) PCT Filed: Dec. 28, 2012

(86) PCT No.: PCT/KR2012/011663
§ 371 (c)(1),
(2) Date: Dec. 8, 2014

(87) PCT Pub. No.: WO2014/046346
PCT Pub. Date: Mar. 27, 2014

(65) Prior Publication Data
US 2015/0188206 A1 Jul. 2, 2015

(30) Foreign Application Priority Data

Sep. 24, 2012 (KR) .................. 10-2012-0105864

(51) Int. Cl.
*H01M 12/08* (2006.01)
(52) U.S. Cl.
CPC ........ *H01M 12/08* (2013.01); *H01M 2220/20* (2013.01); *Y02E 60/128* (2013.01)

(58) Field of Classification Search
CPC .......................... H01M 12/08; H01M 2220/20
See application file for complete search history.

(56) References Cited

U.S. PATENT DOCUMENTS

| 6,444,609 | B1* | 9/2002 | Golovin | B01J 23/34 429/224 |
| 2008/0268327 | A1* | 10/2008 | Gordon | H01M 2/1646 429/50 |
| 2011/0236799 | A1* | 9/2011 | Burchardt | H01M 2/1653 429/534 |

(Continued)

FOREIGN PATENT DOCUMENTS

| JP | 200932400 A | 2/2009 |
| JP | 2009032400 | * 2/2009 |

(Continued)

OTHER PUBLICATIONS

Zhou, Haoshen; Hasegawa, Yasou; Yoshikawa, Hiroyuki; Wang, Yonggang; "Development of a New-type Lithium-Air Battery with Large Capacity", AIST, 2009, http://www.aist.go.jp/; 4pgs.*

(Continued)

*Primary Examiner* — Ula C Ruddock
*Assistant Examiner* — Thomas H. Parsons
(74) *Attorney, Agent, or Firm* — The Webb Law Firm

(57) ABSTRACT

Provided is a lithium air battery, particularly, a lithium air battery capable of being easily charged and discharged to thereby improve performance and reliability, having economic feasibility, preventing leakage of ions, and having firmly inter-coupled electrodes to thereby improve durability.

9 Claims, 12 Drawing Sheets

(56) References Cited

U.S. PATENT DOCUMENTS

| | | |
|---|---|---|
| 2012/0028164 A1 | 2/2012 | Lee et al. |
| 2012/0141889 A1 | 6/2012 | Lee et al. |
| 2012/0183880 A1 | 7/2012 | Toussaint et al. |
| 2012/0237838 A1 | 9/2012 | Uesaka |

FOREIGN PATENT DOCUMENTS

| | | | |
|---|---|---|---|
| JP | 2009230981 | * | 10/2009 |
| JP | 2010287414 A | | 12/2010 |
| JP | 201196492 A | | 5/2011 |
| JP | 2011134595 A | | 7/2011 |
| JP | 2011134628 A | | 7/2011 |
| JP | 201254039 A | | 3/2012 |
| JP | 2012182050 A | | 9/2012 |
| KR | 1020120063163 A | | 6/2012 |
| KR | 1020120093914 A | | 8/2012 |
| WO | WO2011033683 | * | 3/2011 |

OTHER PUBLICATIONS

Korean Office Action 10-2014-7023656, dated Jul. 3, 2018.

* cited by examiner

[FIG. 1]
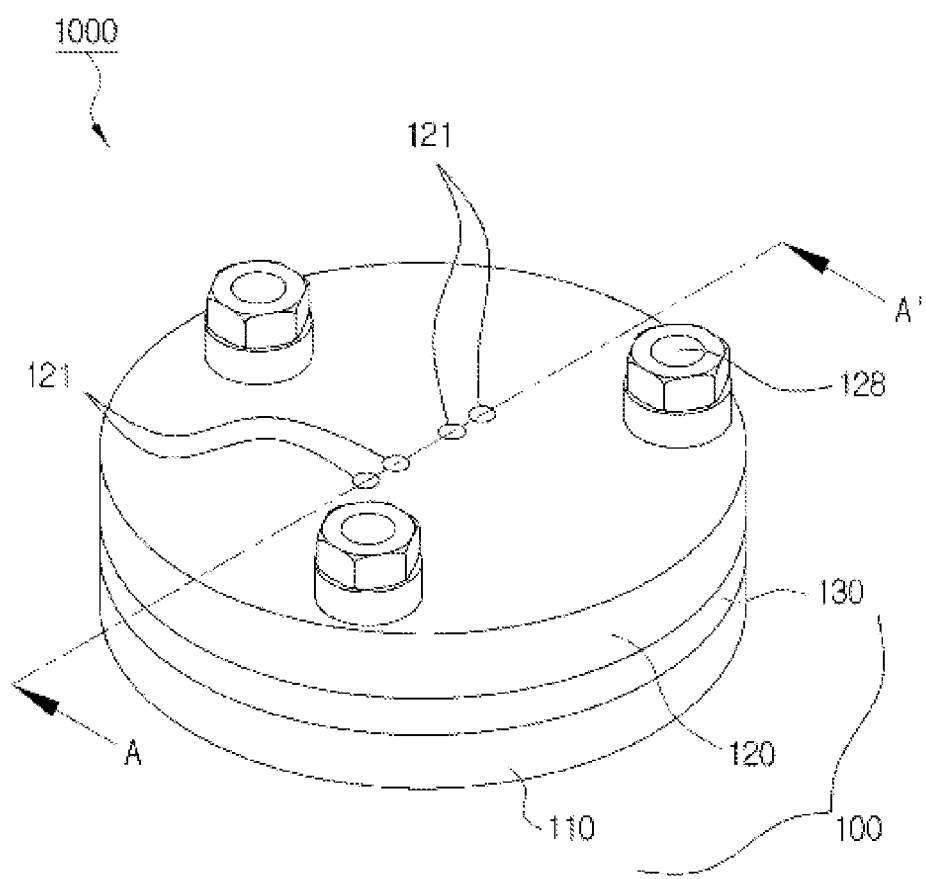

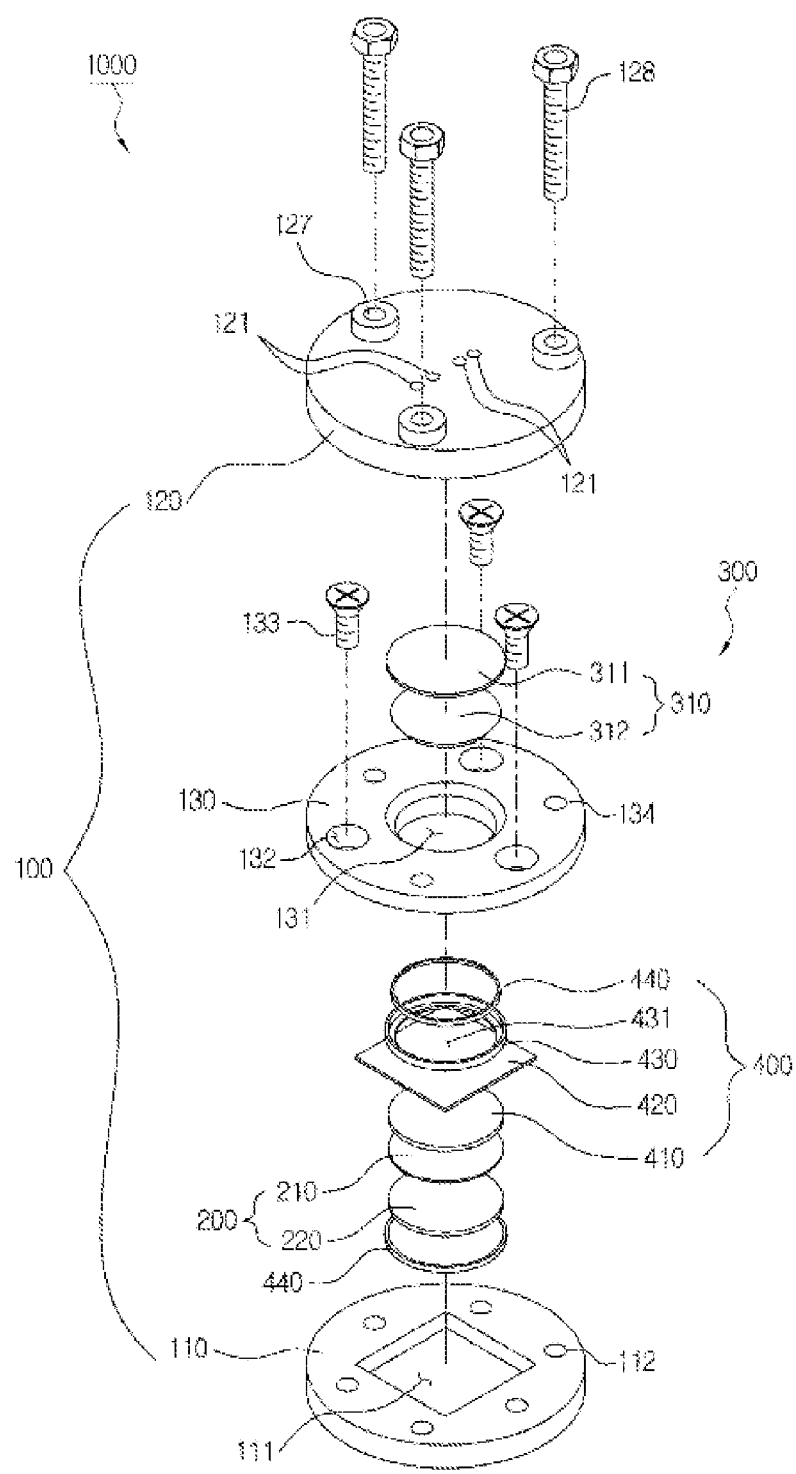
[FIG. 2]

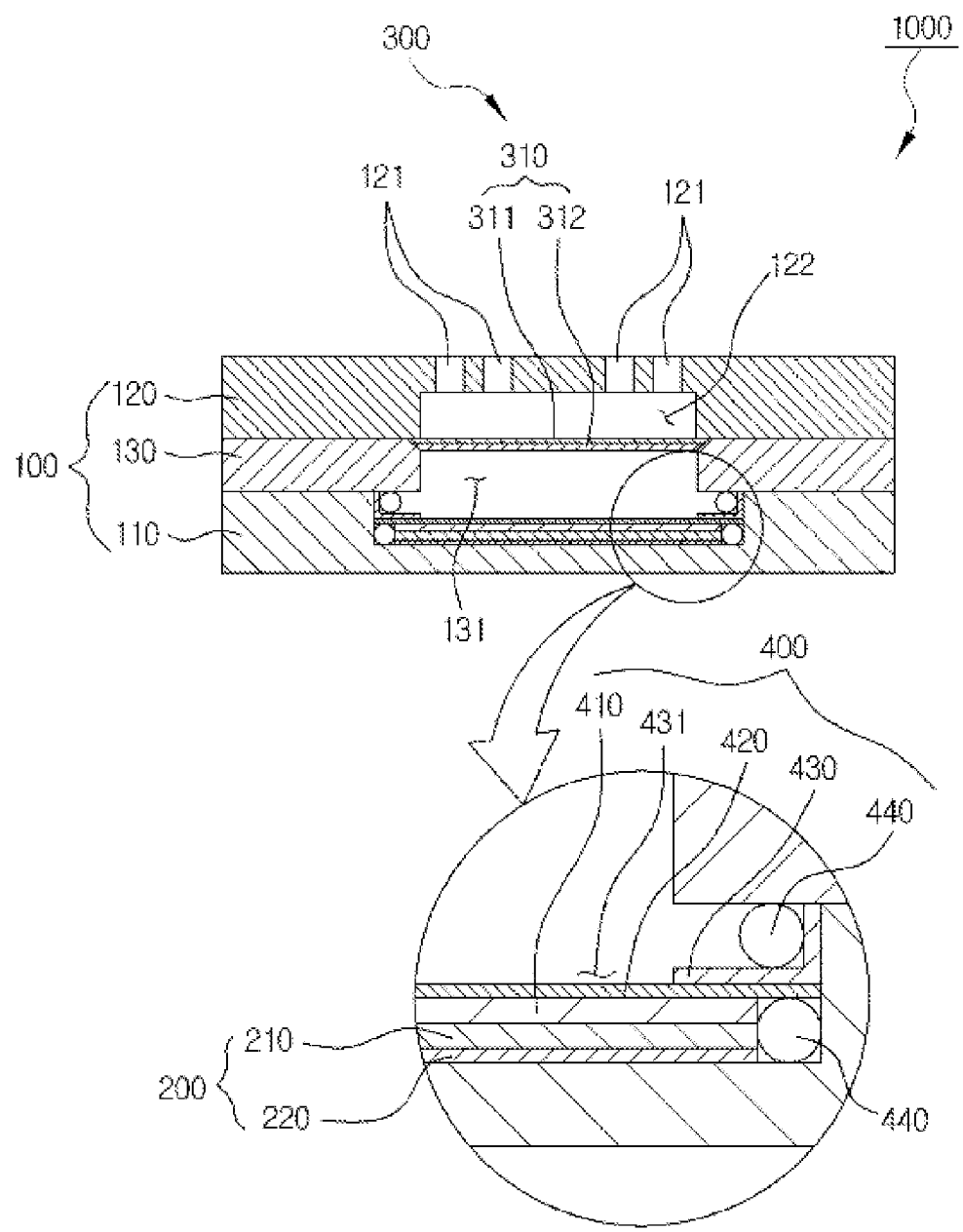
[FIG. 3]

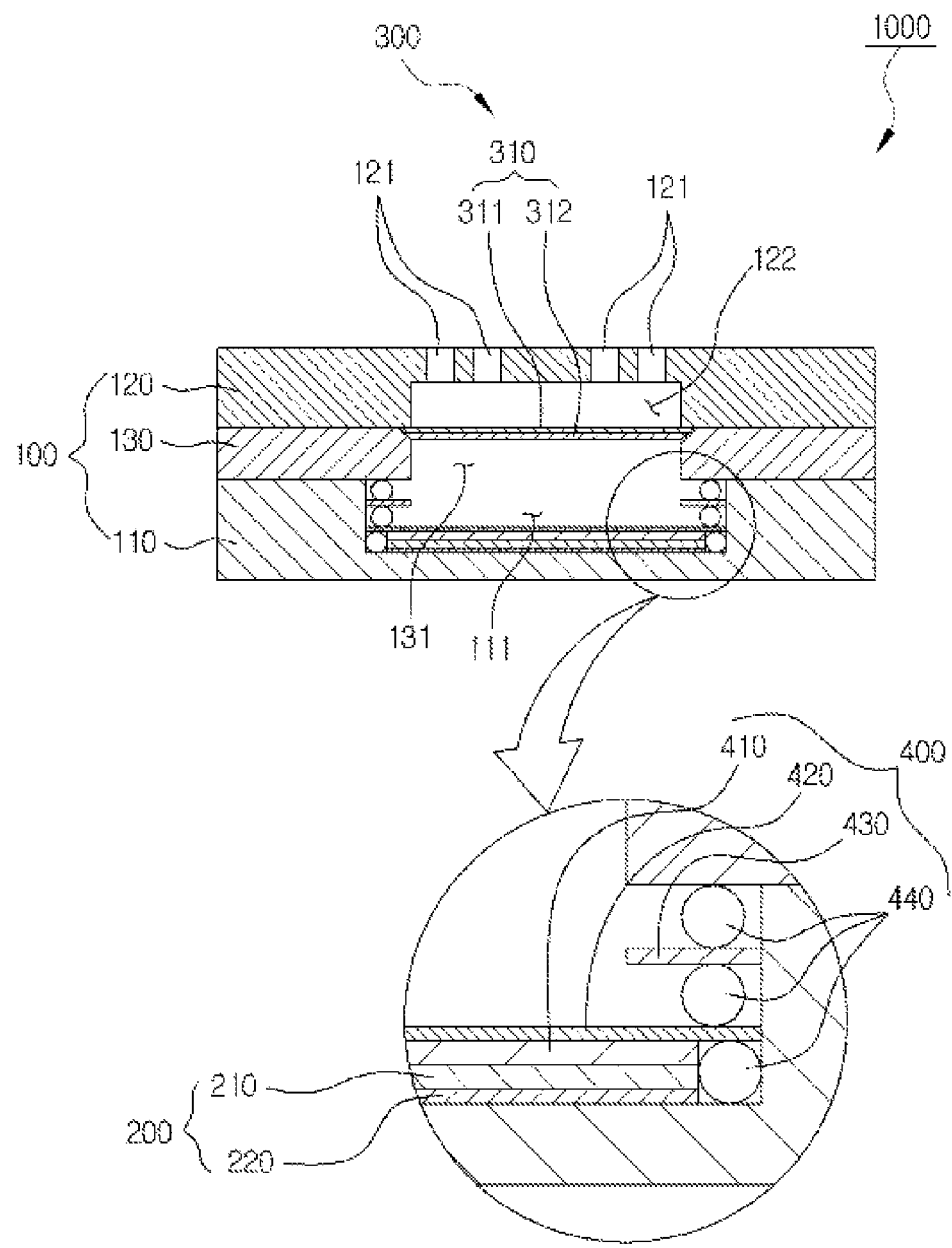
[FIG. 4]

[FIG. 5]
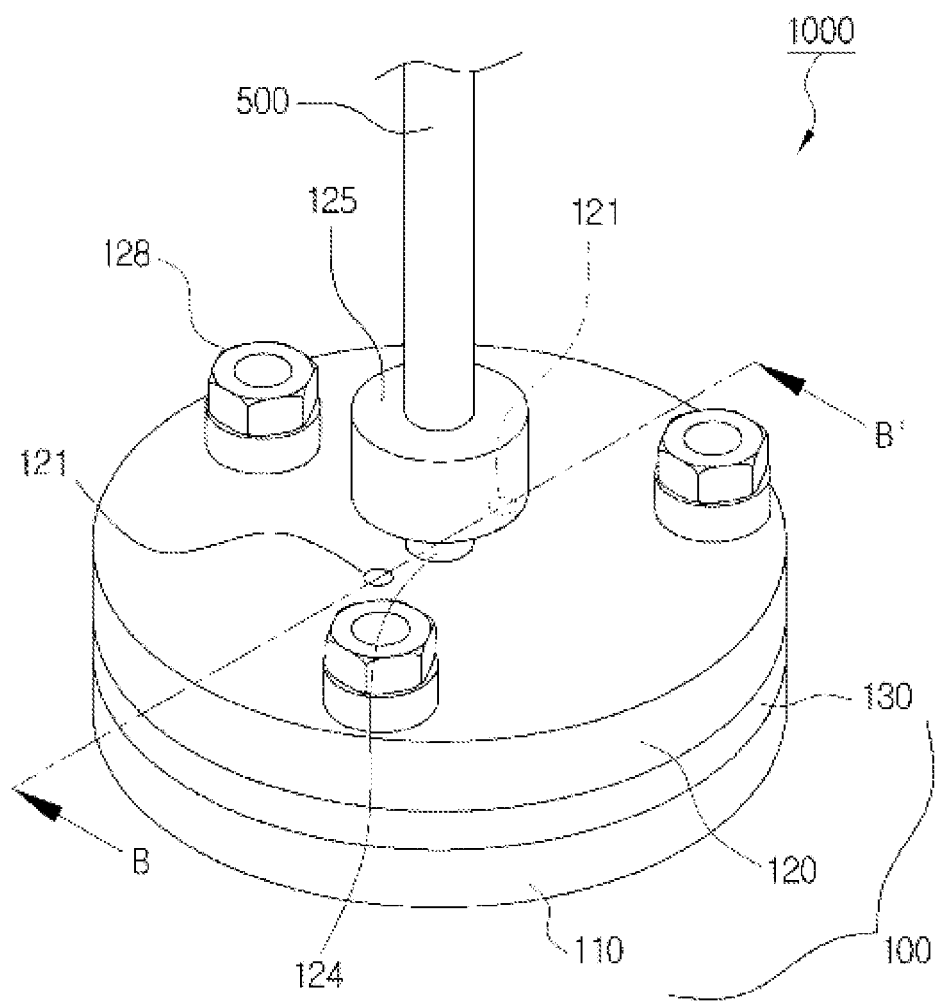

[FIG. 6]
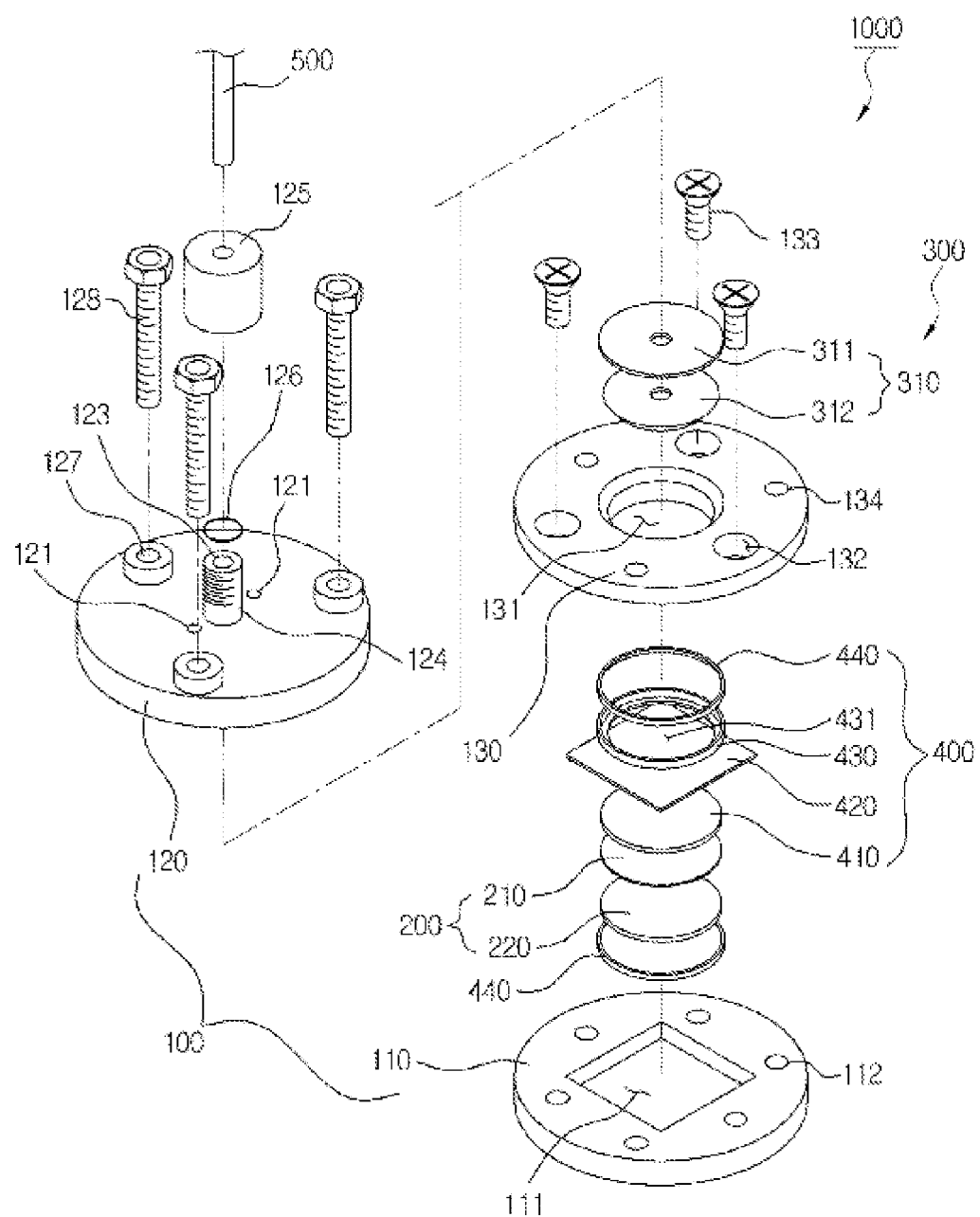

【FIG. 7】
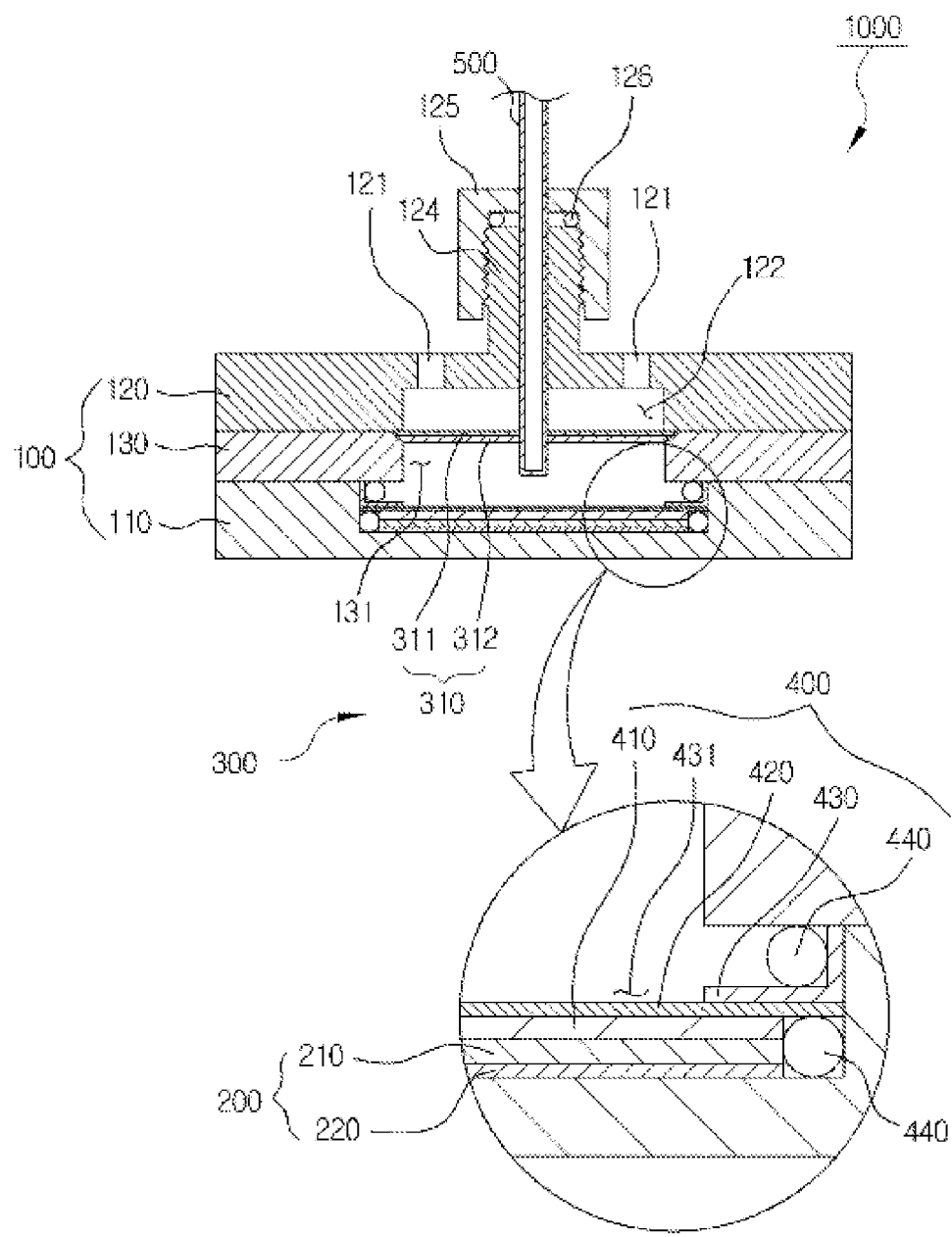

[FIG. 8]
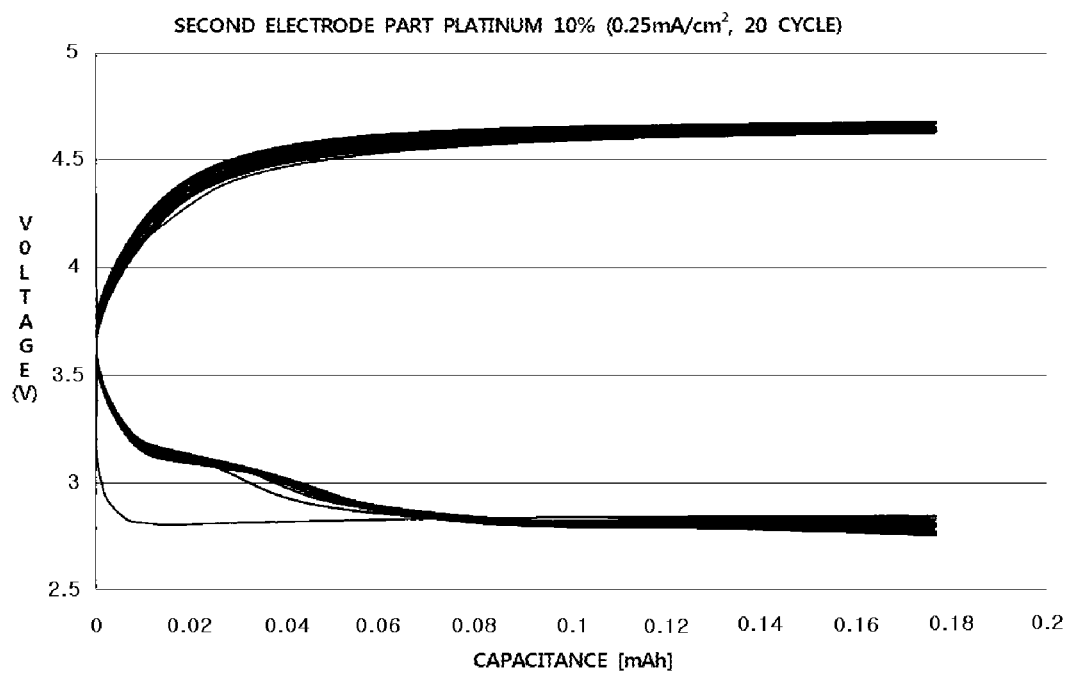
[FIG. 9]
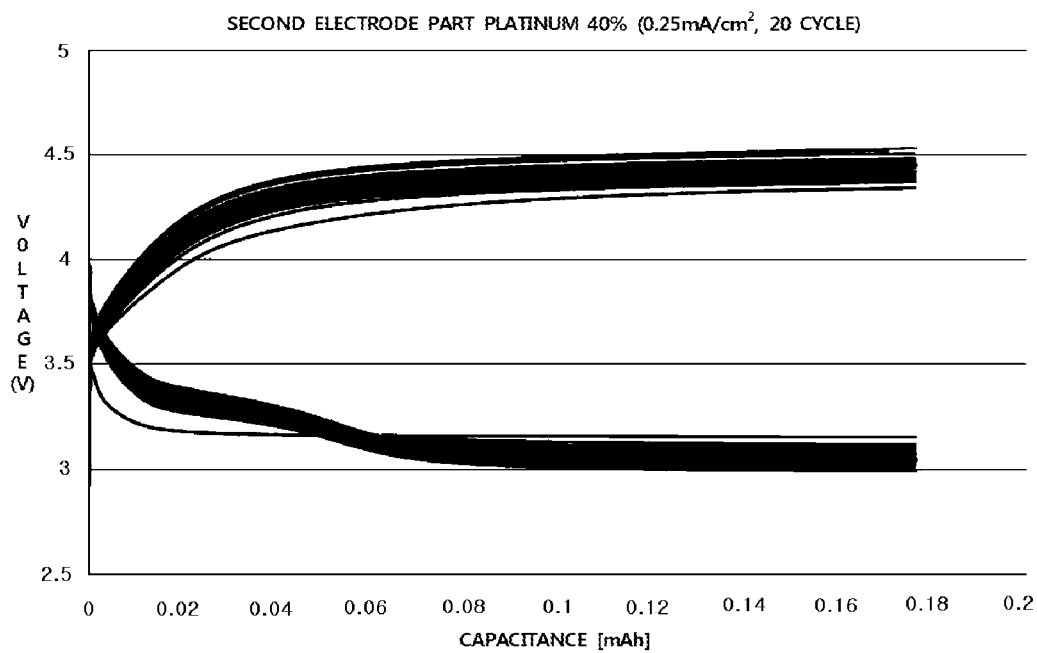

[FIG. 10]
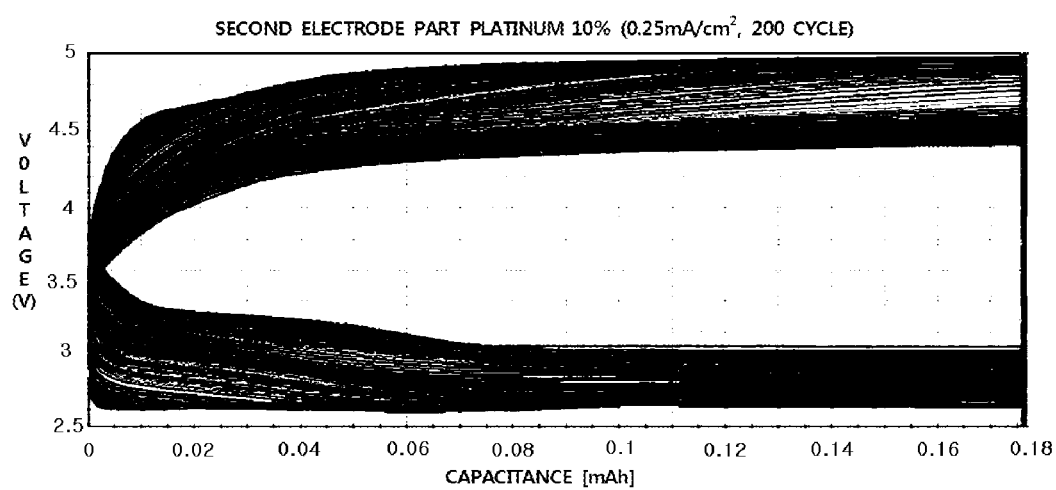
[FIG. 11]
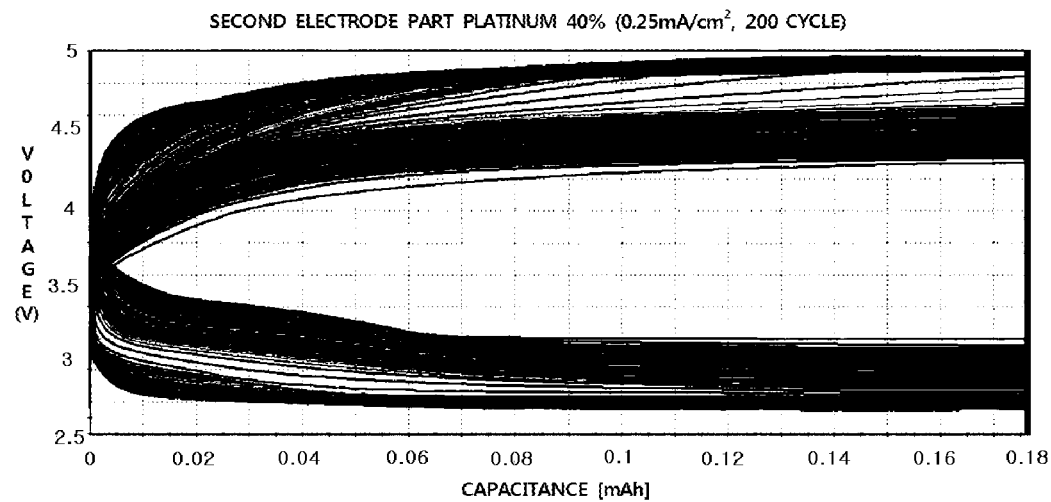

【FIG. 12】
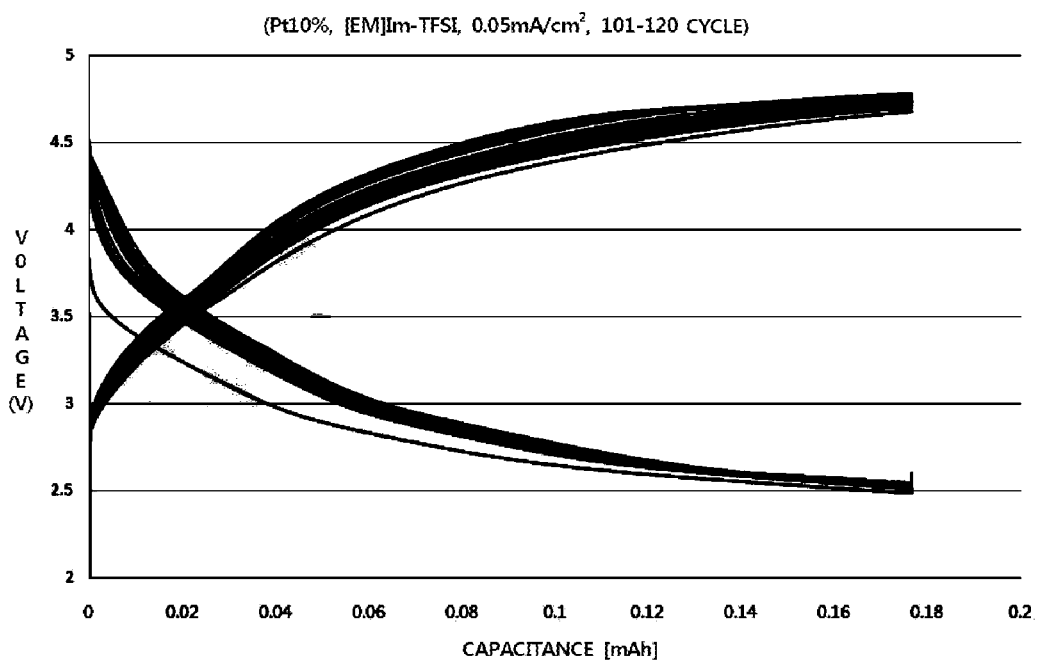
【FIG. 13】
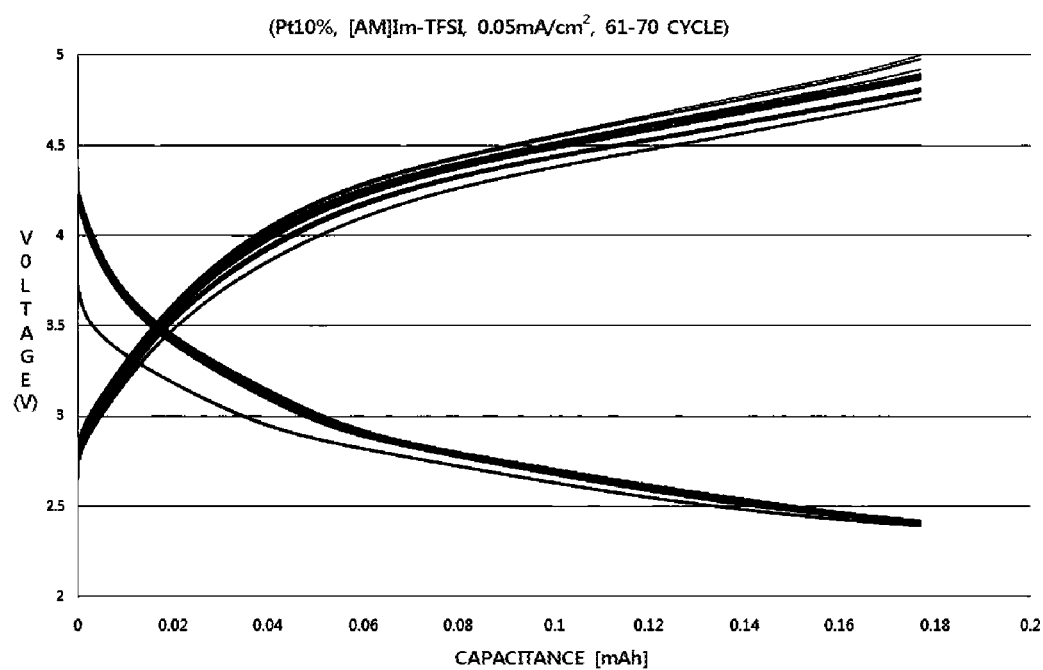

【FIG. 14】
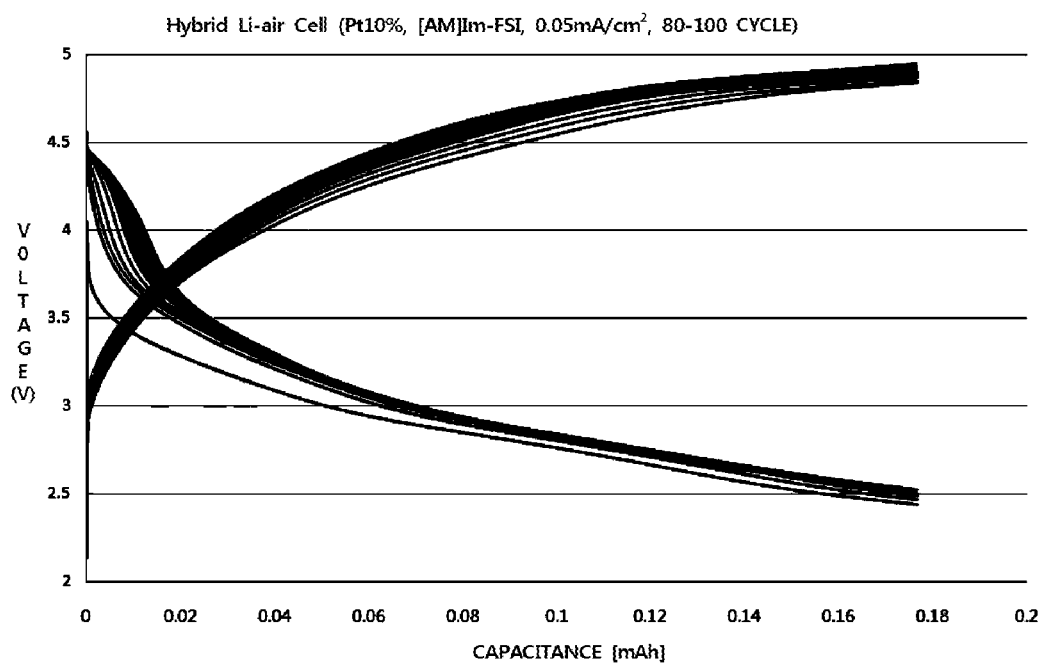
【FIG. 15】
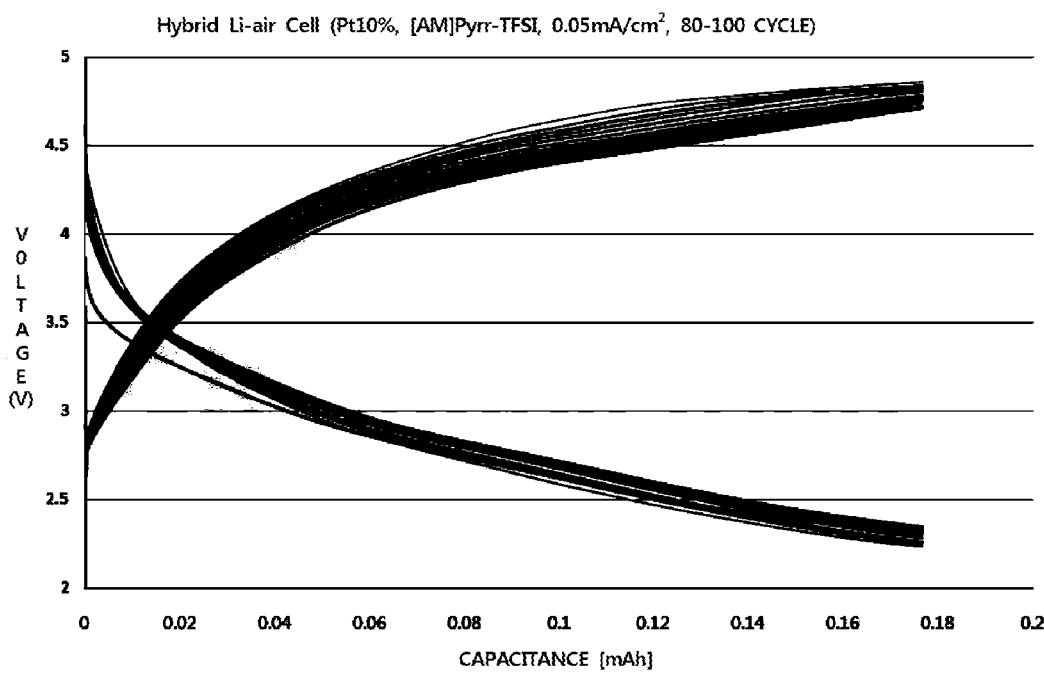

[FIG. 16]
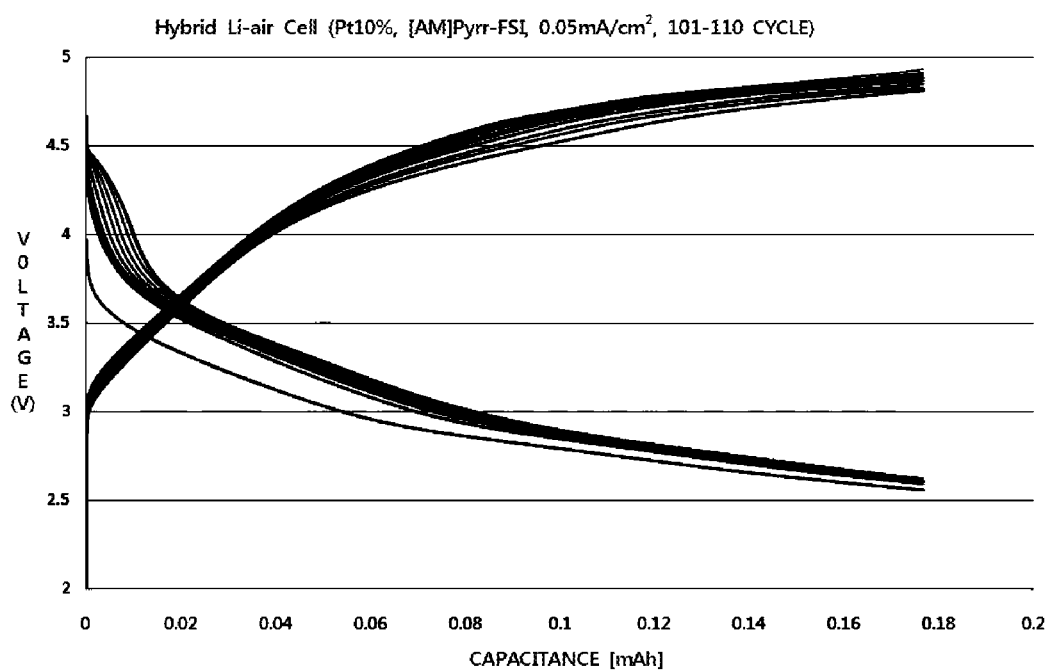

LITHIUM AIR BATTERY

CROSS-REFERENCE TO RELATED APPLICATIONS

This application is the United States national phase of International Application No. PCT/KR2012/011663 filed Dec. 28, 2012, and claims priority to Korean Patent Application No. 10-2012-0105864 filed Sep. 24, 2012, the disclosures of which are hereby incorporated in their entirety by reference.

TECHNICAL FIELD

The present invention relates to a lithium air battery, and more particularly, to a lithium air battery capable of being easily charged and discharged to thereby improve performance and reliability, and having economic feasibility.

BACKGROUND ART

Recently, due to an increase in emissions of carbon dioxide caused by consumption of fossil fuels, a sudden change in crude oil price, or the like, development of a technology of converting a vehicle energy source from gasoline or diesel into electric energy has been spotlighted. Practical use of an electric vehicle has proceeded, and for long distance driving, a lithium ion battery, which is a storage battery, should have a large capacity and high energy density. However, in a current lithium ion battery, there is a limitation in a battery capacity, such that the long distance driving may be difficult. Therefore, a lithium air battery theoretically having larger capacity and higher energy density than those of the lithium ion battery has been spotlighted.

In general, the lithium air battery includes an anode capable of adsorbing and emitting lithium ions and a cathode containing an oxidation reduction catalyst of oxygen using oxygen in the air as a cathode active material, and a lithium ion conductive medium is provided between the cathode and anode.

The lithium air battery has a theoretical energy density of 3000 Wh/kg or more, which corresponds to about 10 times energy density of the lithium ion battery. In addition, the lithium air battery may be eco-friendly and provide improved stability as compared to the lithium ion battery.

The lithium air battery, which is a battery having a cathode using oxygen in the air as an active material, may be charged and discharged by performing an oxidation reduction reaction of oxygen in the cathode.

In a lithium air battery according to the related art, polarization was generated by a high over-voltage at the time of charge and discharge, such that energy efficiency at the time of charge and discharge was significantly low as compared to the lithium ion battery. Therefore, a lithium air battery capable of improving energy efficiency at the time of charge and discharge has been demanded.

In order to solve the above-mentioned problem, according to the related art, a lithium air battery has been disclosed in U.S. Patent Application Publication No. 2012/0028164 (hereinafter, referred to the Related Art Document 1). However, in the lithium air battery disclosed in the Related Art Document 1, chemical characteristics of an electrolyte are improved, but there is a limitation in improving charge and discharge performance of the lithium air battery, and since the coupling is not firm, durability may be deteriorated.

RELATED ART DOCUMENT

Patent Document

US 2012/0028164 A1 (2012 Feb. 2)

DISCLOSURE

Technical Problem

An object of the present invention is to provide a lithium air battery capable of being easily charged and discharged to thereby improve performance and reliability, having economic feasibility, preventing leakage of an aqueous electrolyte, and having firmly inter-coupled electrodes to thereby improve durability.

Technical Solution

In one general aspect, a lithium air battery includes: a housing part including a first housing provided with a space part having an opened upper portion and a second housing provided with an air receiving part disposed on the first housing to seal the space part of the first housing and having an opened lower portion and a vent hole being in communication with the air receiving part; a first electrode part including a lithium metal received in the space part of the first housing; a second electrode part including a porous cathode coupled to a lower portion of the air receiving part of the second housing; and an electrolyte part provided in the space part of the first housing and disposed on the first electrode part.

The first electrode part may include a current collector formed at a lower portion of the lithium metal in a net shape.

In the second electrode part, the porous cathode may be composed of a gas diffusion layer (GDL) and a catalyst layer.

The electrolyte part may include a separator provided on the lithium metal and containing an organic electrolyte and a solid electrolyte provided on the separator.

The electrolyte part may further include a receptor provided on the solid electrolyte and formed with a receiving hole vertically penetrating therethrough, and the receptor may closely adhere the solid electrolyte, the separator, and the first electrode part to the space part.

The electrolyte part may further include a first sealing part allowing the first electrode part to be received and sealed in the space part.

The housing part may further include a third housing interposed between the first housing and the second housing and formed with a fixing hole vertically penetrating therethrough so that the porous cathode is fixed to the fixing hole.

The second housing may be formed with an insertion hole, and the lithium air battery may further include a measurement unit inserted into the insertion hole.

The measurement unit may be a glass sealed probe.

The second housing may include a protrusion part protruding upwardly, and the insertion hole may be formed in the protrusion part.

The second housing may include a supporting part coupled to the protrusion part and a second sealing part provided between the protrusion part and the supporting part.

Advantageous Effects

In the lithium air battery according to the present invention, the electrolyte part includes various electrolyte layers, and contact resistance between the components may be significantly decreased, such that the lithium air battery may be easily charged and discharged, thereby making it possible to improve performance of the lithium air battery and increase the lifespan of the lithium air battery.

In addition, the lithium air battery according to the present invention may prevent leakage of the electrolyte and include the housing part to thereby have firmly inter-coupled electrodes, thereby making it possible to improve durability.

Further, the lithium air battery according to the present invention may measure a lithium ion exponent due to the separately provided measurement unit, such that the lithium ion battery may be easily maintained and repaired, and user convenience may be significantly improved.

DESCRIPTION OF DRAWINGS

FIG. 1 is an assembly perspective view of a lithium air battery according to a first exemplary embodiment of the present invention.

FIG. 2 is an exploded perspective view of the lithium air battery according to the first exemplary embodiment of the present invention.

FIG. 3 is a cross-sectional view taken along line A-A' of FIG. 1.

FIG. 4 is a cross-sectional view taken along line A-A' of FIG. 1, showing other examples of a receptor and a first sealing part.

FIG. 5 is an assembly perspective view of a lithium air battery according to a second exemplary embodiment of the present invention.

FIG. 6 is an exploded perspective view of the lithium air battery according to the second exemplary embodiment of the present invention.

FIG. 7 is a cross-sectional view taken along line B-B' of FIG. 5.

FIGS. 8 to 16 are graphs showing charge and discharge performance of the lithium air battery according to the first exemplary embodiment of the present invention.

BEST MODE

Generally, among various electrochemical energy storage systems, a lithium air battery is one of the most prominent technologies and enables an electric vehicle for a long distance capable of traveling up to 300 miles after being charged to be developed. However, currently, the lithium air battery has not been put to practical use due to limited capacity, a short lifespan, and a durability problem. Therefore, according to an exemplary embodiment of the present invention, there is provided a lithium air battery 1000 capable of being easily charged and discharged, providing sufficient capacity, and having a long lifespan and excellent durability.

FIGS. 1 and 2 are an assembly perspective view and an exploded perspective view of the lithium air battery 1000 according to a first exemplary embodiment of the present invention, respectively, and FIG. 3 is a cross-sectional view taken along line A-A' of FIG. 1.

As shown in FIGS. 1 to 3, the lithium air battery 1000 according to the first exemplary embodiment of the present invention mainly consists of a housing part 100, a first electrode part 200, a second electrode part 300, and an electrolyte part 400.

The housing part 100 includes a first housing 110 and a second housing 120. The first housing 110 has a disk shape, and a space part 111 is provided therein so that an upper portion of the space part 111 is opened. In addition, the second housing 120 is formed in a disk shape and disposed on the first housing 110 to be coupled thereto so that the space part 111 of the first housing 110 is sealed. In this case, an air receiving part 122 is formed in a lower portion of the second housing 120, and a vent hole 121 is formed so as to be in communication with the air receiving part 122, such that external air may be introduced into and discharged from the air receiving part 122 through the vent hole 121. A single vent hole 121 or a plurality of vent holes 121 may be formed, and the vent hole 121 may have various shapes so that air may be introduced into and discharged from the air receiving part 122.

In addition, a first fixing part 127 for coupling to the first housing 110 may be formed at one portion of the second housing 120, and a first coupling part 128 is inserted into the first fixing part 127, such that the second housing 120 and the first housing 110 may be coupled to each other. The first fixing part 127 of the second housing 120 according to the first exemplary embodiment of the present invention is formed of a through hole, the first coupling part 128 is formed of a bolt, and a coupling hole 112 formed of a female screw is formed in the first housing 110 at a position corresponding to the first fixing part 127. The first coupling part 128 penetrates through the first fixing part 127 to thereby be coupled to the coupling hole 112, such that the first housing 110 and the second housing 120 may be coupled to each other. In this case, the first housing 110 and the second housing 120 may be variously coupled to each other by a press-fitting method, a welding, riveting, or the like, in addition to screw coupling.

The first electrode part 200 includes a lithium metal 210, and the lithium metal 210 is received in the space part 111 of the first housing 110. Here, the first electrode part 200 may include the lithium metal 210 capable of storing and emitting lithium ions and further include a binder. As the lithium metal 210, for example, a lithium metal, a lithium metal based alloy, a lithium intercalating compound, or the like, may be used, and in order to improve durability against moisture, or the like, it is preferable that a lithium alloy is used. An example of the binder may include polyvinylidene fluoride (PVdF), polytetrafluoroethylene (PTFE), or the like, and a content of the binder is not particularly limited, but may be, for example, 30 wt % or less, more specifically, 1 to 10 wt %.

The second electrode part 300 includes a porous cathode 310, and the porous cathode 310 is coupled to the lower portion of the second housing 120. In this case, the porous cathode 310 may be coupled so as to seal an opened lower portion of the air receiving part 122 of the second housing 120.

The electrolyte part 400 is provided in the space part 111 of the first housing 110 and disposed on the first electrode part 200. That is, the electrolyte part 400 is provided between the first electrode part 200 and the second electrode part 300 and configured so that the lithium ions may move.

Therefore, the first electrode part 200 including the lithium metal 210 becomes an anode, the second electrode part 300 including the porous cathode 310 becomes a cathode, and the electrolyte part 400 is provided between the first electrode part 200 and the second electrode part 300, thereby configuring the lithium air battery.

In this case, an aqueous electrolyte may be received in the space part 111 of the first housing 110.

Therefore, in the lithium air battery according to the present invention, contact resistance of the electrolyte part 400, the first electrode part 200, and the first housing 110 is decreased, such that efficiency and performance of the lithium air battery may be improved, and a lifespan of the lithium air battery may be increased.

In addition, in the first electrode part 200, a current collector 220 having a net shape may be provided on a lower portion of the lithium metal 210.

The current collector 220 may be provided on the lower portion of the lithium metal 210 in order to allow the lithium metal 210 and the electrolyte part 400 received in the space part 111 of the first housing 110 and the first housing 110 to be closely adhered to each other. In this case, the current collector 220 is configured in an elastic net shape, such that the lithium metal 210 and the electrolyte part 400 may contact each other in the most advantageous state for the reaction. That is, the current collector 220, the lithium metal 210, and the electrolyte part 400 received in the space part 111 of the first housing 110 may be closely adhered to each other by coupling of the second housing 120, such that the contact resistance may be further decreased. In addition, as a material of the current collector 220, copper, stainless steel, nickel, or the like, may be used.

Further, in the second electrode part 300, the porous cathode 310 may be composed of a gas diffusion layer (GDL) 311 and a catalyst layer 312. In this case, the second electrode part 300 is coupled so that the opened lower portion of the air receiving part 122 of the second housing 120 is sealed, but the gas diffusion layer 311 is positioned upward and the catalyst layer 312 is positioned downward. Therefore, the second electrode part 300 is configured so that air received in the air receiving part 122 is diffused through the gas diffusion layer 311 to generate an oxidation reduction reaction between the lithium ions and oxygen in the air in the catalyst layer 312.

That is, in the porous cathode 310, oxygen is used as an active material, and the porous cathode 310 includes a conductive material having pores through which oxygen and the lithium ions may move.

Further, similarly to the first electrode part 200, the second electrode part 300 may include a binder, and the catalyst layer 312 stimulating the oxidation reduction reaction with oxygen may be formed therein.

As an example, the porous cathode 310 may be formed by mixing a catalyst, the conductive material, and the binder and then press-forming the mixture on the gas diffusion layer (or a carbon paper) 311, or mixing and dissolving or dispersing the catalyst, the conductive material, and the binder in an organic solvent such as acetone, methylethylketone, N-methyl-2-pyrrolidone, or the like, to prepare slurry, applying the prepared slurry on the gas diffusion layer 311 using a gravure coating method, a blade coating method, a comma coating method, a dip coating method, or the like, volatilizing the organic solvent, and then pressing the resultant.

In addition, as the conductive material, a carbon material, a conductive fiber such as a metal fiber, or the like, metal powder such as copper powder, silver powder, nickel powder, aluminum powder, or the like, an organic conductive material such as a polyphenylene derivative, or the like, may be used. As the carbon material, carbon black, graphite, activated carbon, carbon nanotubes, carbon fiber, or the like, may be used. Alternatively, mesoporous carbon obtained by firing a synthetic resin including an aromatic ring compound, petroleum pitch, or the like, may be used.

In addition, the electrolyte part 400 may include a separator 410 provided on the lithium metal 210 and containing an organic electrolyte and a solid electrolyte 420 provided on the separator 410.

That is, the separator 410 containing the organic electrolyte is formed on the lithium metal 210 of the first electrode part 200, and the solid electrolyte 420 is formed on the separator 410 and closely adhered thereto. In this case, the aqueous electrolyte may be filled between the solid electrolyte 420 and the second electrode part 300.

Therefore, electrochemical properties and charge and discharge performance of the lithium air battery may be improved.

Here, as the aqueous electrolyte, a material obtained by dissolving lithium acetate dihydrate ($C_2H_3LiO_2$, Sigma-Aldrich), lithium chloride (LiCl, Sigma-Aldrich), and a lithium hydroxide (LiOH, Sigma-Aldrich) salt in D.I. water may be used.

In addition, an ionic liquid may be used as the electrolyte as well as the aqueous electrolyte, and the ionic liquid may be selected from compounds represented by the following Chemical Formula 1 and a mixture thereof.

$X^+Y^-$            [Chemical Formula 1]

[In Chemical Formula 1, $X^+$ is an imidazolium ion, a pyrazolium ion, a pyridinium ion, a pyrrolidium ion, an ammonium ion, a phosphonium ion, or a sulfonium ion, and $Y^-$ is $(CF_3SO_2)_2N^-$, $(FSO_2)SN^-$, $BF_4^-$, $PF_6^-$, $AlCl_4^-$, halogen$^-$, $CH_3CO_2^-$, $CF_3CO_2^-$, $CH_3SO_4^-$, $CF_3SO_3^-$, $(CF_3SO_2)N^-$, $NO_3$, $SbF_6$, $MePhSO_3^-$, $(CF_3SO_2)_3C^-$, or $(R'')_2PO_2^-$ (here, R'' is (C1-C5) alkyl)].

In Chemical Formula 1, examples of the cation ($X^+$) are shown in the following Table 1.

TABLE 1

| Cation ($X^+$) Name | Cation structure |
|---|---|
| imidazolium ion | $R^1-\overset{N}{\underset{\oplus}{\diagup}}\diagdown N-R^3$ <br> $R^2$ |
| pyridinium ion | pyridinium with R at top, $R^6$ at N |
| phosphonium ion | $R^{11}, R^{14}$ on P$\oplus$, $R^{12}, R^{13}$ |
| pyrazolium ion | $R_{18}$ on ring, $\oplus N$, $N-R^{20}$, $R^{19}$ |
| pyrrolidium ion | pyrrolidinium with $R^4, R^5$ on N$\oplus$ |
| ammonium ion | $R^7, R^{10}, R^8, R^9$ on N$\oplus$ |

TABLE 1-continued

| Cation (X+) Name | Cation structure |
|---|---|
| sulfonium ion | $R^{15}\text{-}\overset{R^{17}}{\underset{\oplus}{S}}\text{-}R^{16}$ |

In Table 1, $R^1$ to $R^{20}$ and R are (C1-C20)alkyl, (C2-C20)alkenyl, or (C2-C20)alkynyl, and the alkyl, alkenyl, and alkynyl may be further substituted with at least one selected from hydroxyl, amino, —$SO_3H$, —COOH, (C1-C5)alkyl, (C1-C5)alkoxy, $Si(R^{21})(R^{22})(R^{23})$ ($R^{21}$, $R^{22}$, and $R^{23}$ are each independently hydrogen, (C1-C5)alkyl, or (C1-C5)alkoxy).

In Chemical Formula 1, examples of the anion (Y—) are shown in the following Table 2.

TABLE 2

| Anion (Y−) | Anion Name | Anion (Y−) | Anion Name |
|---|---|---|---|
| $BF_4^-$ | tetrafluoroborate | $(CF_3SO_2)N^-$ | bis[(trifluoromethyl)sulfonyl]amide |
| $PF_6^-$ | hexafluorophosphate | $NO_3^-$ | nitrate |
| $AlCl_4^-$ | aluminium chloride | $SbF_6^-$ | hexafluoroanimonate |
| $X^-$ | Halogen− | $(FSO_2)_2N^-$ | Bis[fluorosulfonyl]imide |
| $CH_3CO_2^-$ | acetate | $MePhSO_3^-$ | tosylate |
| $CF_3CO_2^-$ | trifluoroacetate | $(CF_3SO_2)_2N^-$ | bis(trifluoromethylsulfonyl)imide |
| $CH_3SO_4^-$ | methylsulfate | $(CF_3SO_2)_3C^-$ | tris(trifluoromethylsulfonyl)methide |
| $CF_3SO_3^-$ | trifluoromethylsulfate | $(OR)_2PO_2^-$ | dialkyl phosphate |

An example of the ionic liquid electrolyte may include 1-methyl-3-ethyl imidazolium bis(trifluoromethanesulfonyl)imide, 1-methyl-3-propyl imidazoliumbis(trifluoromethanesulfonyl)imide, 1-methyl-3-allyl imidazoliumbis(trifluoromethanesulfonyl)imide, 1-methyl-3-ethyl imidazoliumbis(fluorosulfonyl)imide, 1-methyl-3-propyl imidazoliumbis(fluorosulfonyl)imide, 1-methyl-3-allyl imidazoliumbis(fluorosulfonyl)imide, 1-methyl-1-propyl pyrrolidium bis(trifluoromethanesulfonyl)imide, 1-methyl-1-allyl pyrrolidium bis(trifluoromethanesulfonyl)imide, 1-methyl-1-propyl pyrrolidium (fluorosulfonyl)imide, 1-methyl-1-allyl pyrrolidium (fluorosulfonyl)imide, 1-butyl-3-methylimidazoliumchloride, 1-butyl-3-methylimidazolium dibutylphosphate, 1-butyl-3-methylimidazolium dicyanamide, 1-butyl-3-methylimidazolium hexafluoroantimonate, 1-butyl-3-methylimidazolium hexafluorophosphate, 1-butyl-3-methylimidazolium hydrogen carbonate, 1-butyl-3-methylimidazolium hydrogen sulfate, 1-butyl-3-methylimidazolium methylsulfate, 1-butyl-3-methylimidazolium tetrachloroaluminate, 1-butyl-3-methylimidazolium tetrachloroborate, 1-butyl-3-methylimidazolium thiocyanate, 1-dodecyl-3-methylimidazolium iodide, 1-ethyl-2,3-dimethylimidazolium chloride, 1-ethyl-3-methylimidazolium bromide, 1-ethyl-3-methylimidazolium chloride, 1-ethyl-3-methylimidazolium hexafluorophosphate, 1-ethyl-3-methylimidazolium tetrafluoroborate, 1-hexyl-3-methylimidazolium tetrafluoroborate, 1-butyl-4-methylpyridinium chloride, 1-butyl-4-methylpyridinium tetrafluoroborate, 1-butyl-4-methylpyridinium hexafluorophosphate, benzyldimethyltetradecylammonium chloride, tetraheptylammonium chloride, tetrakis(decyl)ammonium bromide, tributylmethylammonium chloride, tetrahexylammonium iodide, tetrabutylphosphonium chloride, tetrabutylphosphonium tetrafluoroborate, triisobutylmethylphosphonium tosylate 1-butyl-1-methylpyrrolidinium, 1-butyl-1-methylpyrrolidium bromide, 1-butyl-1-methylpyrrolidium tetrafluoroborate, 1-aryl-3-methylimidazolium bromide, 1-aryl-3-methylimidazolium chloride, 1-benzyl-3-methylimidazolium hexafluorophosphate, 1-benzyl-3-methylimidazolium bis(trifluoromethylsulfonyl)imide, 1-butyl-3-methylimidazolium dibutyl phosphate, 1-(3-cyanopropyl)-3-methylimidazolium bis(trifluoromethylsulfonyl)amide, 1,3-dimethylimidazolium dimethyl phosphate, 1-ethyl-2,3-dimethylimidazolium ethyl sulfate, or the like. A preferable example of the ionic liquid electrolyte may include 1-ethyl-3-methylimidazolium aluminum chloride, 1-butyl-4-methylpyridinium hexafluorophosphate, benzyldimethyltetradecylaluminum chloride, tributylmethylaluminum chloride, tetrabutylphosphinium tetrafluoroborate, 1-butyl-1-methylpyrrolidium chloride, 1-butyl-3-methylimidazolium tetrachloroaluminate, 1-butyl-4-methylpyridinium chloride, 1-butyl-4-methylpyridinium tetrafluoroborate, or the like.

The aqueous electrolyte may include a cation represented by the following Chemical Formula 2 or 3 in order to preferably have high ion conductivity and viscosity exhibiting excellent electric properties.

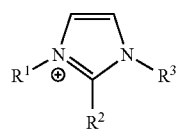

[Chemical Formula 2]

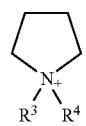

[Chemical Formula 3]

[In Chemical Formulas 2 and 3,
$R^1$ to $R^4$ are (C1-C20)alkyl, (C2-C20)alkenyl, or (C2-C20)alkynyl, and
the alkyl, alkenyl, and alkynyl may be further substituted with at least one selected from hydroxyl, amino, —$SO_3H$, —COOH, (C1-C5)alkyl, (C1-C5)alkoxy, $Si(R^{21})(R^{22})(R^{23})$ ($R^{21}$, $R^{22}$ and $R^{23}$ are each independently hydrogen, (C1-C5)alkyl, or (C1-C5)alkoxy).]

More preferably, the ionic liquid electrolyte may include at least one selected from compounds having the following structures.

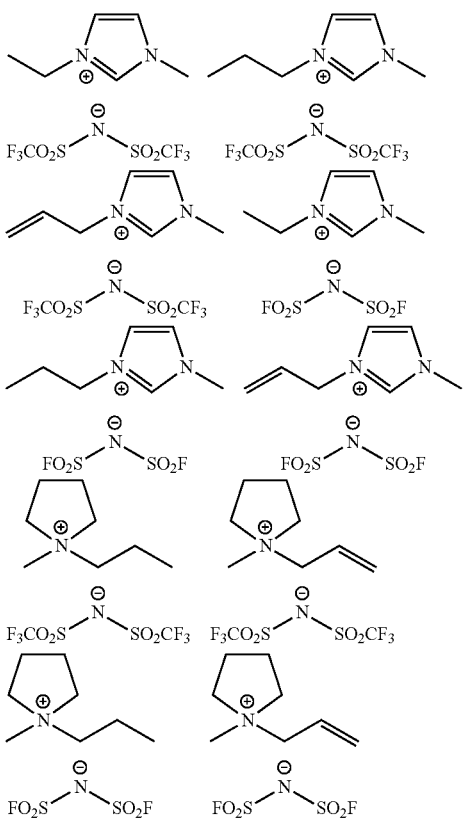

The aqueous electrolyte may include at least one lithium salt selected from a group consisting of $LiPF_6$, lithium bis(fluorosulfonyl)imide (LiTFSI), $LiBF_4$, $LiClO_4$, $LiSbF_6$, $LiAs F_6$, $LiN(SO_2C_2F_5)_2$, $LiN(CF_3SO_2)_2$, $LiN(SO_3C_2F_5)_2$, $LiCF_3SO_3$, $LiC_4F_9SO_3$, $LiC_6H_5SO_3$, LiSCN, $LiAlO_2$, $LiAlCl_4$, $LiN(C_xF_{2x+1}SO_2)(C_yF_{2y+1}SO_2)$ (here, x and y are natural numbers), LiCl, LiI, and $LiB(C_2O_4)_2$. and a concentration of the lithium salt may be 0.025 to 1 mole in order to allow produced $Li_2O_2$ not to inhibit a continuous reaction in a surface of the porous cathode, and increase ion conductivity.

In addition, as the organic electrolyte contained in the separator 410, which is a non-aqueous electrolyte, an organic solvent that does not contain water may be used. As the non-aqueous organic solvent, a carbonate based solvent, an ester based solvent, an ether based solvent, a ketone based solvent, an organosulfur based solvent, an organophosphorus based solvent, or an aprotic solvent may be used.

As the carbonate based solvent, dimethyl carbonate (DMC), diethyl carbonate (DEC), ethylmethyl carbonate (EMC), dipropyl carbonate (DPC), methylpropyl carbonate (MPC), ethylpropyl carbonate (EPC), methylethyl carbonate (MEC), ethylene carbonate (EC), propylene carbonate (PC), fluoroethylene carbonate (FEC), butylene carbonate (BC), or the like, may be used, and as the ester based solvent, methyl acetate, ethyl acetate, n-propyl acetate, dimethylacetate, methylpropionate, ethylpropionate, γ-butyrolactone, decanolide, valerolactone, mevalonolactone, caprolactone, or the like, may be used.

As the ether based solvent, dibutyl ether, tetraglyme, diglyme, dimethoxyethane, 2-methyltetrahydrofuran, tetrahydrofuran, or the like, may be used, and as the ketone based solvent, cyclohexanone, or the like, may be used.

Further, as the organosulfur based solvent and the organophosphorus based solvent, methanesulfonyl chloride and p-trichloro-n-dichlorophosphorylmonophosphazene, and the like, may be used, and as the aprotic solvent, nitriles such as R'CN(R' is a straight, branched, or cyclic hydrocarbon group having 2 to 20 carbon atoms and includes a double bond aromatic ring or an ether bond), and the like, amides such as dimethylformamide, and the like, dioxolanes such as 1,3-dioxolane, and the like, sulfolanes, or the like, may be used.

The non-aqueous organic solvent may be used alone or a mixture of at least two thereof may be used, and in the case of using the mixture of at least two thereof, a mixing ratio may be suitably adjusted according to performance of the desired battery, which may be understood by those skilled in the art.

In this case, the non-aqueous organic solvent may include a lithium salt, and this lithium salt is dissolved in the organic solvent to thereby act as a lithium ion source in the battery. For example, the lithium salt may serve to stimulate movement of the lithium ion between the anode and a lithium ion conductive solid electrolyte 420.

This lithium salt may be the same as or different from the lithium salt included in the aqueous electrolyte, and one or at least two selected from a group consisting of $LiPF_6$, lithium bis(fluorosulfonyl)imide (LiTFSI), $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (here, x and y are natural numbers), LiF, LiBr, LiCl, LiI, and $LiB(C_2O_4)_2$ (lithium bis(oxalato) borate (LiBOB)) may be used.

A concentration of the lithium salt is in a range of 0.1 to 2.0 moles. Since in the case in which the concentration of the lithium salt is in the above-mentioned range, the electrolyte has suitable conductivity and viscosity, performance of the electrolyte may be excellent, and the lithium ion may effectively move. The non-aqueous organic solvent may further include another metal salt, for example, $AlCl_3$, $MgCl_2$, NaCl, KCl, NaBr, KBr, $CaCl_2$, and the like, in addition to the lithium salt.

The solid electrolyte 420 means a lithium ion conductive solid electrolyte membrane and may serve as a protection membrane protecting water included in the aqueous electrolyte so as not to directly react with lithium included in the anode. An example of the lithium ion conductive solid electrolyte 420 as described above may include a lithium ion conductive glass, a lithium ion conductive crystal (ceramic or glass-ceramic), an inorganic material containing a mixture thereof, or the like.

In addition, the lithium air battery 1000 according to the first exemplary embodiment of the present invention further includes a receptor 430 formed by a receiving hole 431 provided on the solid electrolyte 420 and vertically penetrating the receptor 430, and the receptor 430 may closely adhere the solid electrolyte 420, the separator 410, and the first electrode part 200 to the space part 111.

That is, an edge portion of an upper portion of the receptor 430 is pressed by the second housing 120 as shown in FIG. 3, and the solid electrolyte 420, the separator 410, and the first electrode part 200 may be closely fixed to a bottom surface of the space part 111 by the receptor 430. In this case, a central portion of the receptor 430 is formed with the receiving hole 431 so as to vertically penetrate therethrough, such that the receptor 430 is configured so that the aqueous electrolyte may contact the solid electrolyte 420 and ions may move through the receiving hole 431.

Further, the electrolyte part 400 may further include a first sealing part 440 allowing the first electrode part 200 to be received and sealed in the space part 111.

The electrolyte part 400 is configured so that after the first sealing part 440 is disposed at an edge part of the electrolyte part 400, the first electrode part 200 is sealed in the space part 111 by the electrolyte part 400 and the first sealing part 440 by the coupling of the first housing 110 and the second housing 120. That is, the aqueous electrolyte is not introduced in the first electrode part 200, such that corrosion of the lithium metal 210 may be prevented, thereby making it possible to improve the performance and lifespan of the lithium air battery.

In this case, as shown, the first sealing part 440 such as an O-ring is respectively formed at an edge part of a lower portion of the solid electrolyte 420 and the edge part of the upper portion of the receptor 430 of the electrolyte part 400, such that sealing force sealing the first electrode part 200 in the space part 111 may be formed. In addition, the separator 410 containing the organic electrolyte may also be sealed by the solid electrolyte 420 and the first sealing part 440.

Further, as shown in FIG. 4, the receptor 430 may be formed in a plate shape in which the receiving hole 431 is formed an inner portion thereof, the first sealing part 440 is provided at and closely adhered to upper and lower portions of the receptor 430, thereby making it possible to improve sealing force. That is, it is possible to prevent the aqueous electrolyte filled in the space part 111 from being leaked to the outside of the housing part 100, such that performance of the lithium air battery may be further improved.

In this case, the first sealing part 440 may be closely adhered by the coupling of the housing part 100, such that the first electrode part 200, the separator 410, and the solid electrolyte 420 may be closely adhered to a bottom of the space part 111, and the receptor 430 may be closely adhered to an upper surface of the solid electrolyte 420 in a state in which it is floated by a predetermined interval.

Further, the lithium air battery may be configured so that the first sealing part 440 is provided at and closely coupled to the upper and lower portions of the solid electrolyte 420 without the receptor 430 to prevent the aqueous electrolyte from being leaked.

In addition, the housing part 100 may further include a third housing 130 interposed between the first housing 110 and the second housing 120 and formed with a fixing hole 131 vertically penetrating therethrough so that the porous cathode 310 is fixed to the fixing hole 131.

As shown in FIGS. 2 and 3, the third housing 130 is interposed between the first housing 110 and the second housing 120 to thereby be closely adhered thereto. In this case, after the first electrode part 200 and the electrolyte part 400 are received in the space part 111 of the first housing 110, the third housing 130 may be coupled at an upper portion of the first housing 110 so that the electrolyte part 400, the first electrode part 200, and the bottom surface of the space part 111 of the first housing 110 are closely adhered to each other. The first housing 110 and the third housing 130 may be screw-coupled by a second coupling part 133 formed of a bolt and the coupling hole 112 formed of a female screw in the first housing 110. Here, a second fixing part 132 including a through hole formed so that the second coupling part 133 penetrates therethrough is formed in the third housing 130, the second fixing part 132 is formed so that an upper portion thereof is inclined, and the second coupling part 133 is formed of a countersink head bolt so that an upper head portion thereof does not protrude upwardly of an upper surface of the third housing 130, thereby making it possible to facilitate the close coupling between the second housing 120 and an upper portion of the third housing 130.

Then, the second housing 120 is closely coupled to the upper portion of the third housing 130, and a through hole 134 is formed in the third housing 130, such that the first coupling part 128 penetrates through the first fixing part 127 and the through hole 134 to thereby be screw-coupled to the coupling hole 112 of the first housing 110.

In this case, the fixing hole 131 is formed in the third housing 130, and an edge of the second electrode part 300 is closely adhered and fixed between an edge part of an upper portion of the fixing hole 131 and the second housing 120. In this case, the edge part of the upper portion of the fixing hole 131 may be formed to be inclined as shown. Alternatively, a step is formed, such that the edge of the second electrode part 300 may be seated on the step to thereby be fixed. In addition, the aqueous electrolyte may be received in the fixing hole 131, such that ions may move between the first electrode part 200 and the second electrode part 300.

Therefore, the first housing 110, the second housing 120, and the third housing 130 may be firmly coupled and closely adhered to each other, adhesive force of the first electrode part 200 and the electrolyte part 400 may be improved, and the coupling and fixing of the second electrode part 300 may be easily performed.

Further, in the lithium air battery 1000 according to the first exemplary embodiment of the present invention, the housing part 100 is composed of the first housing 110, the second housing 120, and the third housing 130, such that a sealing property may be excellent and durability may be improved as compared to a lithium air battery according to the related art in which an upper portion thereof is open, and a space part is widely formed.

In addition, the first sealing part 440 provided at a lower portion of the electrolyte part 400 is received in the space part 111 of the first housing 110, and a space part 111 having a square shape corresponding to a shape of the solid electrolyte 420 may be formed in the first housing 110. In this case, in order to improve the sealing force of the first sealing part 440 provided at the lower portion of the solid electrolyte 420, it is preferable that the first sealing part 440 is formed to have a diameter larger than or equal to a lamination thickness of the current collector 220, the lithium metal 210 and the separator 410. However, in order to decrease contact resistance, it is preferable that the first sealing part 440 is formed to have a diameter smaller than the lamination thickness of the current collector 220, the lithium metal 210 and the separator 410.

Further, the space part 111 formed in the first housing 110 may have various shapes such as a rectangular shape, a circular shape, an oval shape, and the like, in addition to the square shape.

FIGS. 5 and 6 are an assembly perspective view and an exploded perspective view of a lithium air battery 1000 according to a second exemplary embodiment of the present invention, respectively, and FIG. 7 is a cross-sectional view taken along line B-B' of FIG. 5.

As shown in FIGS. 5 and 6, in the lithium air battery 1000 according to the second exemplary embodiment of the present invention, an insertion hole 123 is formed in a second housing 120, and the lithium air battery 1000 includes a measurement unit 500 inserted into the insertion hole 123.

Here, the measurement unit 500 measures a hydrogen ion exponent (pH), lithium ion conductivity, a dissolved oxygen concentration, or the like, of an aqueous electrolyte provided in the lithium air battery 1000. In this case, the measurement unit 500 is inserted into the insertion hole 123, and as shown in the drawings, an end portion of the inserted measurement unit 500 may penetrate through a second electrode part 300 and be fixed so as to be positioned at an inner portion of a fixing hole 131 or in a space part 111. In addition, the measurement unit 500 does not penetrate through the second electrode part 300, but an insertion hole is formed at a side surface of a third housing 130, such that the measurement unit 500 may be inserted thereinto.

Further, the measurement unit 500 may be a glass sealed probe. The reason is that the measurement unit 500 is formed of the glass sealed probe, such that corrosion of the measurement unit 500 by the aqueous electrolyte and deterioration of performance of the lithium air battery may be prevented. Here, the glass sealed probe has a shape in which a sensor is installed at a glass rod and an outer portion of the sensor is sealed by glass, and an electrolyte part for sensing may be formed so as to be exposed to an outer portion of the glass sealed probe.

In addition, the second housing 120 includes a protrusion part 124 protruding upwardly, and the insertion hole 123 is formed in the protrusion part 124.

The protrusion part 124 is formed in the second housing 120 and the insertion hole 123 is formed in the protrusion part 124 so that the measurement unit 500 may be inserted into the insertion hole 123 to thereby be supported, such that the measurement unit 500 may be firmly coupled and fixed to the second housing 120.

In addition, the second housing 120 includes a supporting part 125 coupled to the protrusion part 124 and a second sealing part 126 provided between the protrusion part 124 and the supporting part 125.

That is, the measurement unit 500 is inserted into the insertion hole 123 formed in the protrusion part 124 of the second housing 120, and the supporting part 125 is coupled to the protrusion part 124, such that the measurement unit 500 may be more firmly supported. In addition, the second sealing part 126 is interposed between the protrusion part 124 and the supporting part 125 and then, closely adhered thereto, thereby making it possible to prevent gas, the electrolyte, or the like, from being leaked through a gap between the coupled protrusion part 124 and supporting part 125. Therefore, reliability of measurement may be improved, and durability of the lithium air battery may be improved.

FIGS. 8 to 11 are graphs showing experimental results of a cycle property of the lithium air battery 1000 according to the first exemplary embodiment of the present invention. In order to obtain the results shown in graphs, the charging and discharging were performed at a condition at which a predetermined current of 0.25 mA/Cm$^2$ flowed, each of the charge and discharge cycles was set to 24 minutes, and a time for which the charging and discharging were not performed was set to 10 minutes.

In addition, a platinum layer may be added to the second electrode part 300, and the graphs shown in FIGS. 7 and 8 show results when 20 charge and discharge cycles were completed at the time of performing an experiment on lithium air batteries 1000 of which platinum weight percents of the platinum layer were 10 wt % and 40 wt %, respectively. In addition, the graphs shown in FIGS. 9 and 10 show results when 200 charge and discharge cycles were completed at the time of performing an experiment on lithium air batteries 1000 of which platinum weight percents of the platinum layer were 10 wt % and 40 wt %, respectively.

As the results obtained by performing the experiment on the lithium air battery 1000 according to the first exemplary embodiment of the present invention under the above-mentioned conditions, it may be appreciated that the lithium air battery 1000 was stably charged and discharged in a plurality of charge and discharge cycles as shown in FIGS. 8 to 11. Therefore, referring to FIGS. 8 to 11, it may be appreciated that the lithium air battery 1000 according to the exemplary embodiment of the present invention has excellent and stable charge and discharge performance.

In addition, FIGS. 12 to 16 are graphs showing results of charge and discharge experiments according to Experimental Examples 1 to 5 shown in the following Table.

| Experimental Example | Absolute Charge and discharge Capacity | Cycle | | Discharge Energy Retention Rate (%) |
|---|---|---|---|---|
| 1 | 0.18 mAh | 120 (total) | 1-40 (Current Density: 0.1 mA/cm$^2$) | 114.8 |
| | | | 41-120 (Current Density: 0.05 mA/cm$^2$) | 103.3 |
| 2 | 0.18 mAh | 70 (total) | 1-40 (Current Density: 0.1 mA/cm$^2$) | 118.9 |
| | | | 41-70 (Current Density: 0.05 mA/cm$^2$) | 102.5 |
| 3 | 0.18 mAh | 100 (total) | 1-40 (Current Density: 0.1 mA/cm$^2$) | 126.8 |
| | | | 41-100 (Current Density: 0.05 mA/cm$^2$) | 105.7 |
| 4 | 0.18 mAh | 100 (total) | 1-40 (Current Density: 0.1 mA/cm$^2$) | 118.5 |
| | | | 41-100 (Current Density: 0.05 mA/cm$^2$) | 103.6 |
| 5 | 0.18 mAh | 110 (total) | 1-40 (Current Density: 0.1 mA/cm$^2$) | 117.6 |
| | | | 41-110 (Current Density: 0.05 mA/cm$^2$) | 107.6 |

As shown in Table and FIGS. 12 to 16, it may be appreciated that in the lithium air battery according to the present invention, since an ionic liquid was used instead of an aqueous electrolyte according to the related art, a hydrophobic functional group of an ionic liquid compound prevented infiltration of moisture, such that cycle properties were significantly improved.

Further, in the case of using a lithium metal as an anode, according to the related art, it was difficult to secure a lifespan of several ten cycles or more due to an influence of moisture, but it may be appreciated that in the lithium air battery according to the present invention, infiltration of moisture was basically blocked due to its structure, such that an excellent cycle property of 100 cycles or more may be secured under air atmosphere, and a discharge energy retention rate was significantly high (80% or more).

Further, in the lithium air battery according to the present invention, an electric short circuit was prevented, and the lithium air battery according to the present invention had a short stabilization time of 30 minutes to 1 hour, as compared to a general half-cell having a stabilization time of at least 4 to 12 hours.

In addition, in the lithium air battery according to the present invention, excellent charge and discharge properties were obtained by using an ionic liquid, particularly, an ionic liquid having an FSI anion or TFSI anion as an aqueous electrolyte to thereby decrease deterioration caused by a decomposition reaction with lithium.

The present invention is not limited to the above-mentioned exemplary embodiments but may be variously applied, and may be variously modified by those skilled in the art to which the present invention pertains without departing from the gist of the present invention claimed in the claims.

[Detailed Description of Main Elements]

| | |
|---|---|
| 1000: lithium air battery | |
| 100: housing part | |
| 110: first housing | |
| 111: space part | 112: coupling hole |
| 120: second housing | 121: vent hole |
| 122: air receiving part | 123: insertion hole |
| 124: protrusion part | 125: supporting part |
| 126: second sealing part | 127: first fixing part |
| 128: first coupling part | |
| 130: third housing | 131: fixing hole |
| 132: second fixing part | 133: second coupling part |
| 134: through hole | |
| 200: first electrode part | |
| 210: lithium metal | 220: current collector |
| 300: second electrode part | |
| 310: porous cathode | |
| 311: gas diffusion layer | 312: catalyst layer |
| 400: electrolyte part | |
| 410: separator | 420: solid electrolyte |
| 430: receptor | 431: receiving hole |
| 440: first sealing part | |
| 500: measurement unit | |

The invention claimed is:

1. A lithium air battery comprising:
a housing part including a first housing provided with a space part having an opened upper portion and a second housing provided with an air receiving part disposed on the first housing to seal the space part of the first housing and having an opened lower portion and a vent hole being in communication with the air receiving part;
a first electrode part including a lithium metal received in the space part of the first housing;
a second electrode part including a porous cathode coupled to a lower portion of the air receiving part of the second housing; and
an electrolyte part provided in the space part of the first housing and disposed on the first electrode part, wherein the electrolyte part includes:
a separator provided on the lithium metal and containing an organic electrolyte and a solid electrolyte provided on the separator;
a receptor provided on the solid electrolyte and formed with a receiving hole vertically penetrating therethrough, and the receptor closely adheres the solid electrolyte, the separator, and the first electrode part to a lower portion of the space part,
wherein the solid electrolyte is spaced apart from the second electrode part, and the electrolyte part has an aqueous electrolyte or an ionic liquid received between the solid electrolyte and the second electrode part spaced apart from each other, and
wherein the second housing presses the receptor against the solid electrolyte, the separator, and the first electrode part to secure the solid electrolyte, the separator, and the first electrode part against a lower portion of the space part.

2. The lithium air battery of claim 1, wherein the first electrode part includes a current collector formed at a lower portion of the lithium metal in a net shape.

3. The lithium air battery of claim 1, wherein in the second electrode part, the porous cathode is composed of a gas diffusion layer (GDL) and a catalyst layer.

4. The lithium air battery of claim 1, wherein the electrolyte part further includes a first sealing part allowing the first electrode part to be received and sealed in the space part.

5. The lithium air battery of claim 1, wherein the housing part further includes a third housing interposed between the first housing and the second housing and formed with a fixing hole vertically penetrating therethrough so that the porous cathode is fixed to the fixing hole.

6. The lithium air battery of claim 1, wherein the second housing is formed with an insertion hole, and it further includes a measurement unit inserted into the insertion hole.

7. The lithium air battery of claim 6, wherein the measurement unit is a glass sealed probe.

8. The lithium air battery of claim 7, wherein the second housing includes a protrusion part protruding upwardly, and the insertion hole is formed in the protrusion part.

9. The lithium air battery of claim 8, wherein the second housing includes a supporting part coupled to the protrusion part and a second sealing part provided between the protrusion part and the supporting part.

* * * * *